Sept. 20, 1966 R. C. GEBHARDT ETAL 3,274,484
POWER CONTROL NETWORK
Filed May 5, 1964
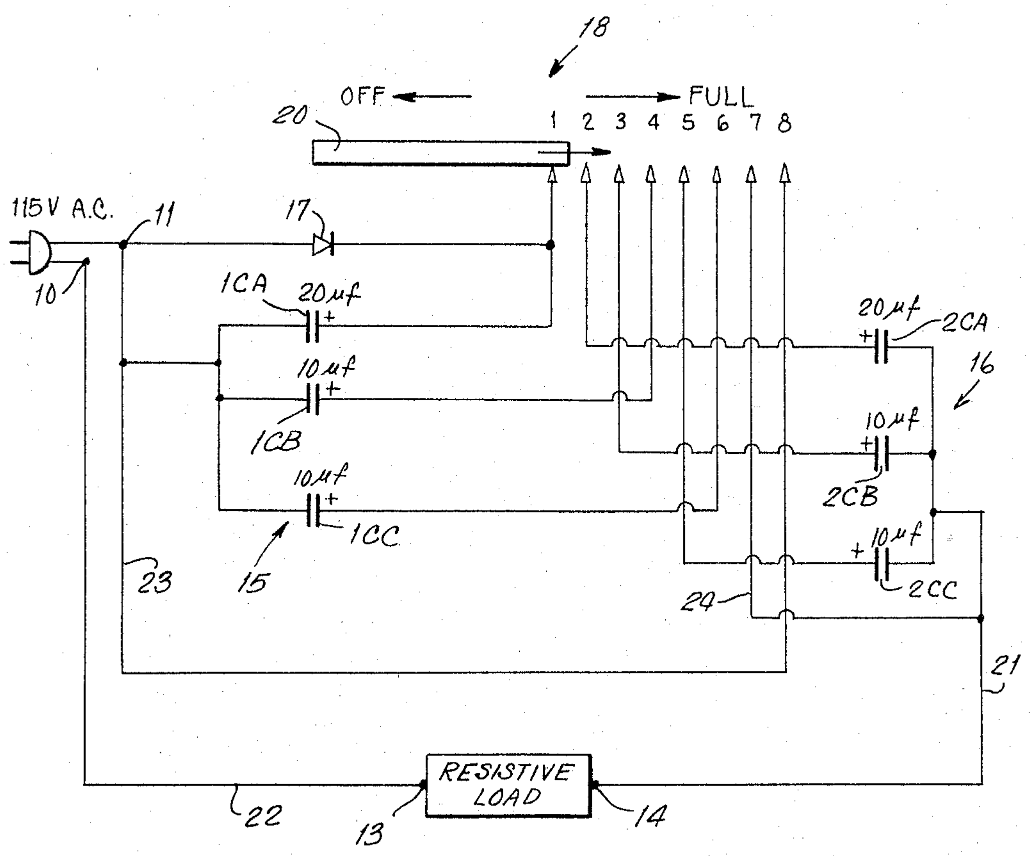
INVENTORS
ROBERT C. GEBHARDT
JOHN S. LORY
BY Krazinski + Nolan
ATTORNEYS

United States Patent Office 3,274,484
Patented Sept. 20, 1966

3,274,484

POWER CONTROL NETWORK

Robert C. Gebhardt, Parsippany, N.J., and John S. Lory, 6700 192nd St., Flushing 65, N.Y.; said Gebhardt assignor to said Lory Filed May 5, 1964, Ser. No. 365,078
8 Claims. (Cl. 323—93)

The present invention relates to power control networks and, more particularly, to an improved network for controlling alternating current power supplied to a resistive load, such as an incandescent lamp or a heating element.

The invention is directed to lamp and heating circuits where, in order to provide at the lamp or heater a voltage lower than the full line voltage, a plurality of components are inserted in series therewith, so that the amount of line voltage to be subtracted is provided across these components. To avoid heat dissipation by resistive components, reactive components have been preferred. Inductive components, such as coils, autotransformers, etc., are not used because (a) their windings inherently have some resistance, which would generate heat, (b) their cores, if iron, have eddy current losses resulting also in the generation of heat and (c) their cores, being laminated, tend to buzz audibly. Thus, capacitors with a low power factor (low leakage) are used. Because of the magnitude of capacitance involved, electrolytic type capacitors are recommended, for their small size.

An object, therefore, of the present invention is to provide such a control network which avoids heat dissipation by eliminating resistive components other than the load itself.

Another object is to provide such a control network having capacitive reactance elements which do not waste any appreciable amount of power as heat.

A further object is to provide such a control network which is simple and compact in arrangement and is economical to manufacture and is particularly useful in lamp dimming circuits.

In accordance with the present invention, the foregoing objects are accomplished by providing a network which generally comprises terminals for an alternating current power source; terminals for a resistive load; variable reactance means having first and second groups of capacitive components; a diode for polarizing the capacitive components; and cumulative switch means and conductors arranged for connecting the load and the reactance means in series to the power source and for connecting the diode in parallel with the first group of components and for connecting the diode in series with the second group of components to thereby vary the power supplied to the load. In its preferred form, the network includes switch contacts and conductors arranged for shunting out step by step the reactance means to thereby connect the load directly to the power source.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein the single figure is a wiring diagram of a control network in accordance with the present invention.

Referring now to the drawing in detail, there is shown a network which generally comprises terminals 10 and 11 for connection to a suitable power source such as a 115 volt alternating current line, terminals 13 and 14 for connecting a resistive load therebetween with the terminal

13 connected to the power source terminal 10, a first group of capacitors 15, a second group of capacitors 16, a diode 17, and switch means 18 with conductors arranged for connecting the diode and the capacitors to the load in the manner described hereinafter.

The first group of capacitors 15 comprises one or more capacitors 1CA, 1CB and 1CC each having one terminal connected to the power source terminal 11. The second group of capacitors 16 comprises one or more capacitors 2CA, 2CB and 2CC equal in number to the number of capacitors of the first group and each having one terminal connected to the load terminal 14. The capacitors 1CA and 2CA, 1CB and 2CB, and 1CC and 2CC are shown having like values respectively, for example 20 mfd., 10 mfd. and 10 mfd. in the order named. Preferably, the capacitors are of the dry electrolytic type which have high values but yet are small in size and the capacitance values of the second group are equal to or more than those of the first group.

The switch means 18 is of the cumulative type and comprises eight contacts consecutively numbered 1 to 8 and arranged in that order so that contact 1 is the first of the contacts and contact 8 is the last of the contacts, and a movable element, such as a slidable conductive bar 20 which is arranged for connecting an increasing number of contacts upon movement to the right, as viewed, and a decreasing number of contacts upon movement to the left.

The diode 17 is connected between the power source terminal 11 and the switch contact 1. Preferably, the diode is of the semiconductor type.

The other terminals of the first group of capacitors 1CA, 1CB and 1CC are respectively connected to the switch contacts 1, 4 and 6; and the other terminals of the second group of capacitors 2CA, 2CB and 2CC are respectively connected to the switch contacts 2, 3 and 5.

The switch contact 7 is connected to the load terminal 14 and the switch contact 8 is connected to the power source terminal 11. Thus, when the slidable bar 20 bridges the contacts 7 and 8 to interconnect the same, the load is connected directly to the power source by the connection of the terminals 10 and 13 and the connection of the terminals 11 and 14, as will be described hereinafter.

The network illustrated and described herein, as exemplary of the invention, has six levels of power supply designated as 1/7 through 6/7, as well as an "off" and "full" position.

In operation of the circuit step by step from "off" to "full" position, the network functions as follows:

(1) In the "off" position, the slidable bar 20 engages only the switch contact 1, whereby the load circuit is open and no current flows through the load.

(2) In the 1/7 position, the slidable bar 20 engages the switch contacts 1 and 2 so that current flows from the power source terminal 11 through capacitor 1CA and diode 17 connected in parallel, thence through switch contact 1, slidable bar 20, switch contact 2, capacitor 2CA and over lead 21 to the load terminal 14, after which the current returns to the source via the load, terminal 13, lead 22, and terminal 10. The diode insures that the capacitors 1CA and 2CA see only a voltage of one polarity as indicated in the drawing.

(3) In the 2/7 position, the slidable bar 20 engages the switch contacts 1 to 3, to increase the capacitance in the network, so that there is less voltage drop in series with the load. This increase in capacitance is accomplished by connecting the capacitors 2CA and 2CB in parallel with each other and in series with the capacitor 1CA and the diode 17. It has been found that the value of the capacitance provided by the group of capacitors 16 must never be less than the value of the capacitance provided by the group of capacitors 15, so that the capacitors never see a voltage of incorrect polarity which could cause the generation of heat.

(4) In the 3/7 position, the slidable bar 20 engages the switch contacts 1 to 4 to connect the capacitor 1CB in parallel with the capacitor 1CA and the diode to thereby increase the capacitance in the network and thus, further lower the voltage drop in series with the load.

(5) In the 4/7 position, the slidable bar 20 engages the switch contacts 1 to 5 to connect the capacitor 2CC in parallel with the capacitors 2CA and 2CB and in series with the capacitors 1CA and 1CB of group 15 and the diode 17 to thereby further increase the capacitance and lower the voltage drop in series with the load.

(6) In the 5/7 position, the slidable bar 20 engages the switch contacts 1 to 6 to connect the capacitor 1CC in parallel with the diode and the capacitors 1CA and 1CB to thereby still further increase the total capacitance and reduce the voltage drop in series with the load.

(7) In the 6/7 position, the bar 20 engages the switch contacts 1 to 7 to shunt out all capacitors of the group 16 whereby the diode 17 in parallel with the group 15 cacapitors is connected to the load and full current flows therethrough for half of each cycle. In this instance the group 15 capacitors permit some current to flow whenever the diode 17 is not conducting. It is to be noted that, while the group 16 capacitors are shorted, nevertheless the capacitance thereof is infinite and, accordingly, greater than the capacitance of the group 15 capacitors.

(8) In the last position, the slidable bar so engages the switch contacts 1 to 8 to shunt out the entire network including the capacitors of groups 15 and 16 and diode 17 to enable the load to receive full power source voltage, as may be traced from terminal 11 via conductor 23, switch contact 8, slidable bar 20, switch contact 7, conductors 24 and 21 through the load and thence over conductor 22 to terminal 10.

The diode 17 must handle the peak forward current and must withstand the peak back inverse voltage. In the network disclosed herein in which the load is a 60 watt, 110 volt incandescent lamp, a diode having a two ampere (peak) and a 400 peak-inverse-voltage rating may be employed. Such a diode also may be employed for dimming a 100 watt or 150 watt lamp. However, when using a 150 watt load it is advisable to employ capacitors 1CA and 2CA having a value of 30 or 40 mfd. and capacitors 1CB, 1CC, 2CB and 2CC each having a capacitance of 10 mfd. For controlling a 100 watt load, the capacitors 1CA and 2CA may have a value of 20 mfd. and the other capacitors each of 10 mfd., as indicated on the drawing.

From the foregoing description it will be seen that the present invention provides an improved alternating power control network for resistive loads which with a minimum of components has seven power level supply selections. Of course, lesser or more supply selections may be used. It will also be seen that by the use of dry, electrolytic capacitors a large capacitance having relatively small physical size is available, which factor enables the same to be readily assembled with the other components of the network in lamp bases. Further, by the use of the diode not only correct polarity of the electrolytic capacitors is assured but, when the switch is in the 6/7 position, the diode permits full line voltage to appear across the load for half of each cycle.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. An alternating current power control network for resistive loads comprising terminals for an alternating current power source, terminals for a resistive load, variable means having first and second groups of reactive components, a diode, and cumulative switch means and conductors arranged for connecting the load and said reactance means in series to the power source and for connecting said diode in parallel with said first group of components and for connecting said diode in series with said second group of components to thereby vary the power supplied to the load.

2. A network according to claim 1, wherein said network includes switch contacts and conductors arranged for shunting out said reactance means to thereby connect the load directly to the power source.

3. An alternating current power control network for resistive loads comprising first and second terminals for connection to an alternating current power source; first and second terminals for connecting a resistive load, said first power source terminal being connected to said first load terminal; a group of switch contacts arranged in a predetermined order; a movable switch element arranged for conductively connecting an increasing number of said contacts upon movement in one direction and a decreasing number of said contacts upon movement in the opposite direction; a diode connected between said second power source terminal and the first of said contacts; first capacitor means of a given value connected between said second power source terminal and the first of said contacts; and second capacitor means of like value as said first capacitor means connected between said second load terminal and the second of said contacts; the next-to-last of said contacts being connected to said second load terminal and the last of said contacts being connected to said second power source terminal.

4. A network according to claim 3, wherein said capacitor means are of the dry electrolytic type.

5. A network according to claim 3, wherein said first capacitor means includes a first and second capacitor and said second capacitor means includes a first and second capacitor with said first capacitors having like values and said second capacitors having like values, said first capacitor of said first capacitor means being connected to the first of said contacts, said first capacitor of said second capacitor means being connected to the second of said contacts, said second capacitor of said second capacitor means being connected to the third of said contacts and said second capacitor of said first capacitor means being connected to the fourth of said contacts.

6. A network according to claim 5, wherein said first and second capacitors have different values.

7. A network according to claim 6, wherein said first capacitors have a greater value than said second capacitors.

8. A network according to claim 5, wherein said first and second capacitor means each include a third capacitor of like value, said third capacitor of said second capacitor means being connected to the fifth of said contacts and said third capacitor of said first capacitor means being connected to the sixth of said contacts.

References Cited by the Examiner

UNITED STATES PATENTS

| | | | |
|---|---|---|---|
| 2,005,986 | 6/1935 | Behr | 322—93 X |
| 3,036,263 | 5/1962 | Hallas | 323—93 X |
| 3,075,123 | 1/1963 | Faulds | 315—240 |

JOHN F. COUCH, *Primary Examiner.*

A. D. PELLINEN, *Assistant Examiner.*